Feb. 24, 1970 W. K. PRIESE 3,497,178
BALL VALVE WITH MOVABLE YIELDABLE POLYMERIC SEATS
Filed March 21, 1968 2 Sheets-Sheet 1

Inventor
Werner K. Priese
By: Olson, Trexler, Wolters & Bushnell
Attys

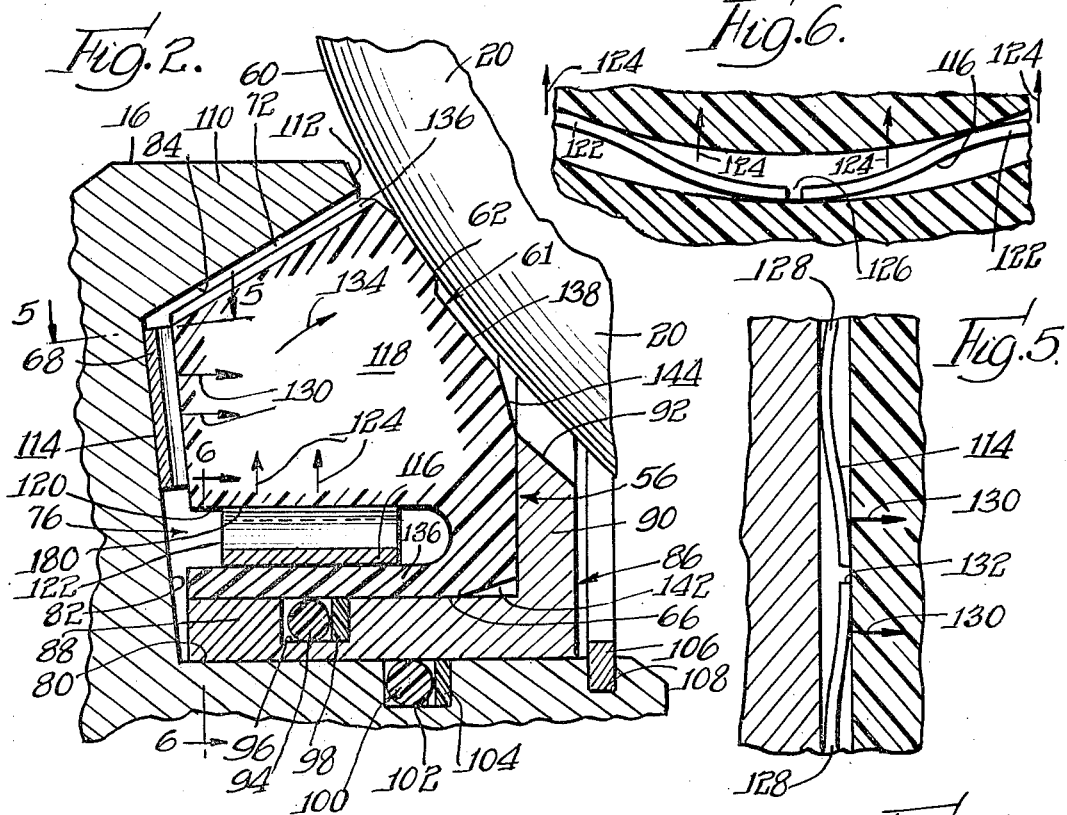
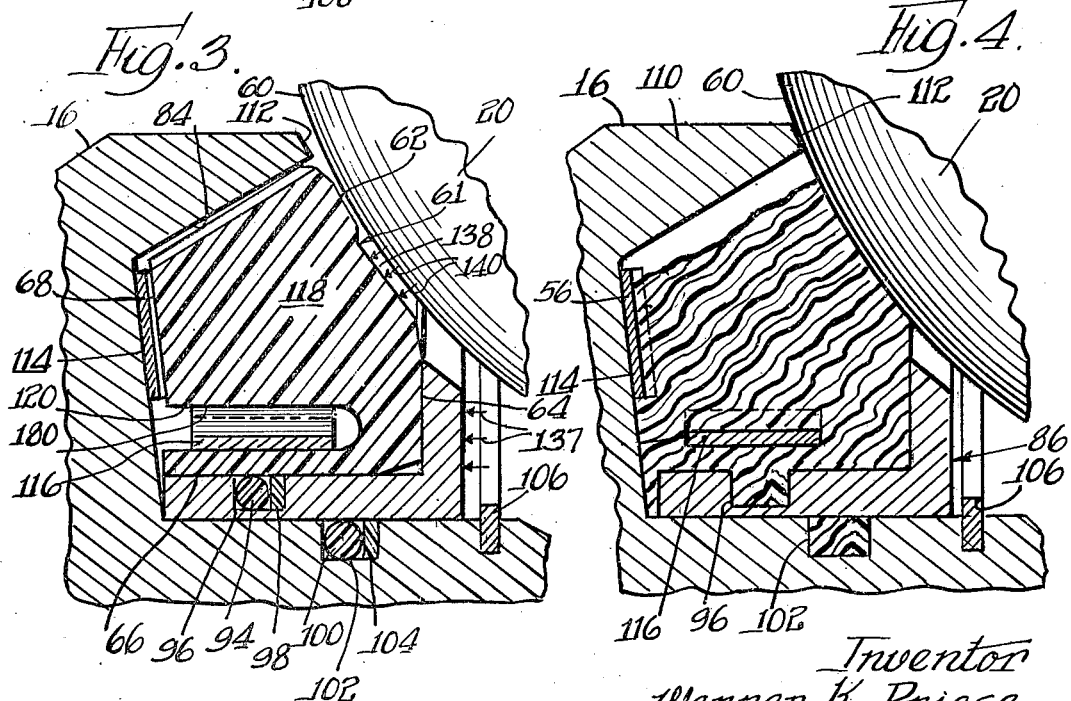

United States Patent Office 3,497,178
Patented Feb. 24, 1970

3,497,178
BALL VALVE WITH MOVABLE YIELDABLE POLYMERIC SEATS
Werner K. Priese, Barrington, Ill., assignor to Hills-McCanna Company, Carpentersville, Ill., a corporation of Delaware
Filed Mar. 21, 1968, Ser. No. 714,917
Int. Cl. F16k 25/02, 15/04, 5/06
U.S. Cl. 251—174                                  7 Claims

ABSTRACT OF THE DISCLOSURE

A ball valve in which the major portion of a yieldable polymeric valve seat accommodated in an annular recess is hinged and continuously urged swingably against the ball by the radial force of a first annular compression spring and by the generally axial force of a second annular compression spring. Dislodgment and serious distortion by the seat are avoided by support provided to the seat by sides of the recess and by a seat support ring that can be removed for replacement of the seat. Excessive fluid pressure within the valve caused by expansion of fluid trapped in the valve is relieved harmlessly by action of the seat to overcome the spring supporting forces and release the excessive volume of the entrapped fluid.

---

The present invention relates to ball valves which individually are sealed against the leakage of fluid past the valve ball by yieldable polymeric seats.

Valves of this general character afford many inherent advantages but are, nevertheless, subject to various shortcomings. In such valves, yieldable polymeric seats which are marked by worthwhile advantages are not uncommonly subject to loss of effectiveness in service. Such loss in effectiveness can stem from the fact that yieldable polymeric materials which can afford some of the greatest advantages in the construction of valve seats are characteristically subject to cold flow under applied stress and to distortion under load.

Some expedients used previously for the purpose of minimizing deleterious distortion of yieldable polymeric seats in ball valves have been poorly adapted to obtain maximum effectiveness from the seats in sealing against the leakage of fluid through the valve and have contributed to poor service performance generally.

One object of the present invention is to provide an improved ball valve sealed against the leakage of fluid through the valve by yieldable polymeric valve seats having, by virtue of the improved construction of the valve, a highly effective dynamic sealing action fully effective from the time the valve is first put into service and retaining its full effectiveness over an advantageously prolonged service life.

Another object is to provide an improved ball valve which is effectively sealed on the upstream side of the ball as well as on the downstream side by yieldable polymeric seats, the major portion of each seat being swingably against the ball by a force which is the vector sum of radially inward force of an annular spring acting on the seat structure and the axially inward force of an annular spring acting on the seat structure.

A further object is to provide an improved ball valve as recited in the preceding object in which the cumulative force of springs acting on the yieldable polymeric seat structure is distributed widely over the seat structure so that harmful concentrations of stress on the yieldable seat structure are effectively avoided.

Another object is to provide an improved ball valve of the character recited in which the annular spring that exerts a radially inward force on the valve seat structure in conjunction with the axially inward spring force applied to the seat structure also effects yieldably a radially expanding action on the yieldable polymeric seat structure that serves to advantage in providing and preserving an effective fluid seal between the yieldable polymeric seat structure and the valve body.

Another object is to provide a ball valve as recited in the preceding objects in which the yieldable polymeric seat structure is confined against dislodgment or serious distortion by a coacting seat ring that is removable for ultimate replacement of the seat after prolonged usage in the event that becomes desirable.

In conjunction with the preceding objects, a further object is to provide an improved ball valve which operates effectively to block the flow of fluid through the valve in the event the yieldable polymeric seat structure is caused to collapse by excessive temperature such as may occur in the event the valve is exposed to the heat of a fire.

Other objects and advantages will become apparent from the following description of the exemplary embodiment of the invention illustrated in the drawings, in which:

FIGS. 2 is a fragmentary sectional view on an enlarged scale, corresponding to the sectional view of a seat appearing in the lower left portion of FIG. 1 and showing in radial section one valve seat together with an adjacent portion of the ball engaged by the seat and adjacent seat supporting structure of the valve body;

FIG. 3 is a view similar to FIG. 2 but illustrating the action of the valve seat to release the excessive volume of fluid entrapped and heated in the valve;

FIG. 4 is a view similar to FIG. 2 for illustrating the manner in which a reasonably effective temporary seal is formed between the valve ball and the valve body in the event the yieldable polymeric structure of the valve seat collapses when heated by a fire to an excessively high temperature;

FIG. 5 is a fragmentary sectional view taken with reference to the line 5—5 of FIG. 2 and illustrating a segment of the axial compression spring and adjacent portions of the coacting seat and body support structure; and FIG. 6 is a fragmentary sectional view taken along the line 6—6 of FIG. 2 and illustrating a segment of the radial compression spring and adjacent portions of the coacting seat.

Figure 1:
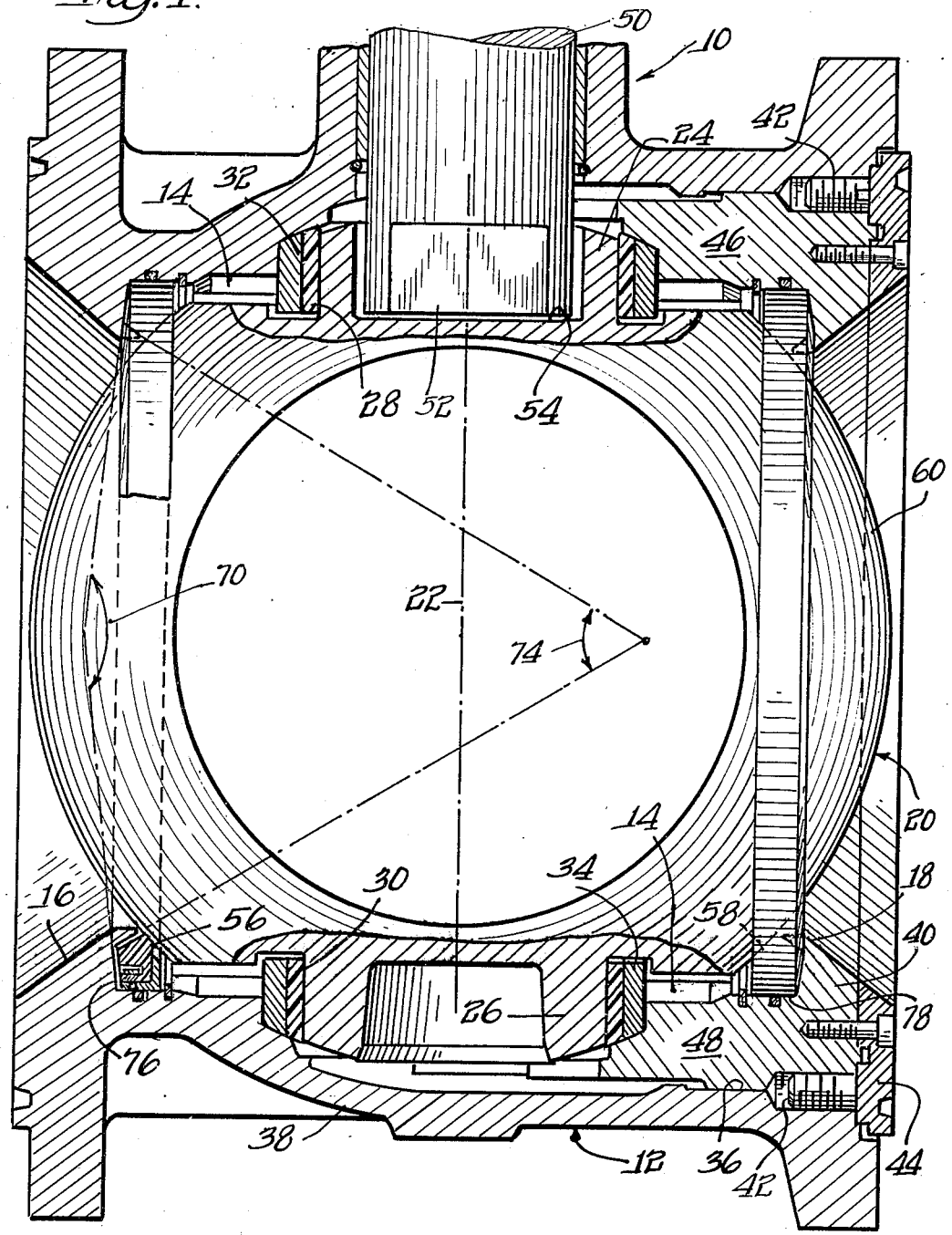
FIG. 1 is a longitudinal sectional view of an improved ball valve embodying the invention.

Referring now to the drawings in greater detail, the ball valve 10 forming the exemplary embodiment of the invention illustrated comprises a valve body 12 defining an internal valve chamber 14 and two flow passages 16, 18 opening into opposite sides of the chamber. As shown, the valve body 12 is flanged at opposite ends for connection to coacting conduits (not shown).

A centrally bored flow control ball 20 disposed within the chamber 14 is journalled for rotation about an axis 22 by two trunnions 24, 26 on the ball projecting in opposite directions into coacting trunnion bearings 28, 30. In the preferred construction illustrated, the trunnion bearings 28, 30 are formed of a resilient bearing material which will yield somewhat under the radial load applied by the trunnions 24, 26 to allow transferal of a portion of the force of fluid pressure on the ball when the valve is closed to the downstream valve seat, as will be presently described.

Further, as will presently appear, operation of the instant valve to provide an effective blocking of fluid flow through the valve even in the event of destruction of the heat-sensitive valve seats to be described is obtained by constructing the trunnion bearings 28, 30, which are sleeve bearings as shown, from a material that is heat sensitive to the extent that it will effectively collapse from loss of structural strength when heated by the heat of a fire to an abnormally high temperature which is less than that which would produce a structural failure of either the valve ball 20 or the valve body 12.

One heat sensitive yieldable material that can be used for this purpose in the construction of the trunnion sleeve bearings 28, 30 is polytetrafluoroethylene which can be reinforced by an internal dispersion of an infusible, inorganic material. However, it will be appreciated that other bearing materials of suitable physical qualities can be selected by those skilled in the art for construction of the trunnion bearings.

The yieldable trunnion bearings 28, 30 are supported by sturdy metal sleeves 32, 34 encircling the respective bearings 28, 30 and being supported in turn on the body 12.

With reference to the valve illustrated, the ball 20 is assembled into the valve chamber 14 through a large opening 36 in one section 38 of the valve body 12. Subsequent to the ball being moved into place in the chamber 14, a second section 40, FIG. 1, of the valve body 12, having a generally annular form, is fitted into the opening 36 in the body section 38 after the ball and is secured in place as shown by a plurality of removable threaded elements 42 covered in this instance by a removable ring 44.

Two bearing support projections 46, 48 on the inner side of the annular body member 40 project axially inward to support the adjacent sides of the respective trunnion bearing support sleeves 32, 34, the opposite sides of the sleeves 32, 34 being supported by the main body section 38 as illustrated.

The ball 20 is rotated between its open valve position and its closed valve position, shown in FIG. 1, by a control stem 50 extending rotatably through one side of the body section 38 and having a flatted inner tang 52 which fits into a coacting slot 54 in the ball trunnion 24 to transmit control torque to the ball.

When the ball 20 is turned to its closed valve position illustrated in FIG. 1, the valve is effectively sealed against the flow of fluid through the valve past the ball by two valve seats 56, 58 formed of yieldable polymeric material and slidably engaging the spherically curved external surface 60 of the ball 20 in encircling relation to the inner ends of the respective passages 16, 18.

The two seats 56, 58 are constructed as mirror images of each other and are similarly supported in the valve body 12 and for this reason a description in detail of the seat 56 and its coacting structure in conjunction with its mode of operation will provide, in conjunction with the general description, an adequate understanding of the construction and operation of both seats 56, 58.

The seat 56, typical of the two seats 56, 58, has an overall, annular form and is constructed of a yieldable polymeric material, which can be selected by a person skilled in the art of designing ball valves from a selection of yieldable polymeric materials known in the art and used in the construction of ball valve seats.

Examples of yieldable polymeric materials which can be used as structural materials for the valve seats 56, 58 include nylon; polytetrafluoroethylene, sold commercially under the trademark "Teflon"; polytrifluoromonochloroethylene, sold commercially under the trademark "Kel-F" and similar materials. In some instances, it may be desirable to use such yieldable polymeric materials reinforced by a dispersion of solid particles of infusible, inorganic material, for example alumina. Polytetrafluoroethylene reinforced by an internal dispersion of infusible, inorganic material affords distinct advantages as a structural material for the seats 56, 58 and is commercially available from the Polymer Corporation, Reading, Pennsylvania under the trademark "Fluorsint."

As viewed in radial section, FIG. 2, the yieldable polymeric seat 56 has a generally pentagonal shape, having five sides all annular in form. The annular side 61 confronting the ball surface 60 defines a ball sealing surface 62 of considerable lateral width which has in radial section a concave shape conforming to the convex shape of the ball surface 60 and being adapted to fit sealably against the latter.

The inner edge of the ball confronting side 61 joins a flat radial surface 64 extending radially outward on the seat 56 to form the axially inward side (also denoted by the number 64) of the seat 56. The outer edge of the axially inward side or surface 64 of the seat 56 joins a generally cylindrical surface 66 on the seat 56 forming the radially outward side or periphery of the seat, denoted by the same reference number.

The edge of the radially outward side 66 remote from the side 64 joins the axially outward side 68 of the seat 56, which is in the form of a truncated conical surface denoted by the same reference number and having a wide apex angle 70 diverging axially inward, as illustrated by phantom lines in FIG. 1. The radially inward edge of the axially outward side 68 joins the radially inward side 72 of the seat 56 formed by a surface denoted by the same reference number and having a truncated conical shape with a narrow apex angle 74 opening axially outward with reference to the seat 56 as indicated by phantom lines in FIG. 1.

The two yieldable polymeric seats 56, 58 are disposed in large measure respectively within two annular recesses 76, 78 formed in the body 12 adjacent the ball 20 in encircling relation to the inner ends of the respective flow passages 16, 18, the two recesses 76, 78 being shaped generally as mirror images of each other.

The annular recess 76, for example, opens inwardly toward the ball 20, as shown in FIGS. 1 and 2, and has three structural sides 80, 82 and 84. The radially outward side 80 of the recess 76 is generally cylindrical. It is coaxial with the radially outward side 66 of the seat 56, but is somewhat larger in diameter to provide radial clearance for accommodation of a seat retaining ring 86 to be described. The axially outward side or bottom 82 of the recess 76 has a truncated conical shape conforming to that of the opposing axially outward side 68 of the seat 56. Similarly, the radially inward side 84 of the recess 76 has a truncated conical shape paralleling that of the radially inward side 72 of the seat 56.

The previously mentioned seat retaining ring 86 has a cylindrical leg 88 closely encircling the radially outward cylindrical side 66 of the seat 56 and extending into the recess 76 along substantially the full length of the seat surface 66 and in closely adjacent relation to the radially outward, cylindrical surface 80 of the seat accommodating recess 76. The seat retaining ring 86 is generally L-shaped in radial section and has a flat annular leg 90 extending from the inner portion of the cylindrical ring leg 88 radially inward along the inward side 64 of the seat 56. The radially inward edge 92 of the radial retaining ring leg 90 is shaped to conform to the opposing ball surface 60 but stops somewhat short of the ball surface 60, as illustrated in FIG. 2, so that the seat 56 normally projects inwardly beyond the retaining ring leg 90 to engage the seat sealing surface 62 with the ball surface 60 as shown in FIG. 2.

A continuous circumferential seal is formed between the outer radial side 66 of the seat 56 and the retaining ring cylindrical leg 88 by an O-ring seal 94 slidably engaging a medial portion of the seat surface 66 and being seated in an inwardly facing groove 96 formed in the seat ring 88 and also accommodating a backup ring 98 for the O-ring 94. The O-ring 94 may be formed from a suitable silicone material, for example, and the backup ring 98 may be formed of polytetrafluoroethylene.

In a somewhat similar manner, a seal is formed between the cylindrical leg 88 of the retaining ring 86 and the valve body 12 by a silicone O-ring 100 encircling and engaging a medial longitudinal portion of the retaining ring leg 88 and being seated in an inwardly open groove 102 recessed in the side 80 of the seat accommodating recess 76. The annular groove 102 also accommodates a backup ring 104 for the O-ring seal 100, the backup ring 104 being formed of polytetrafluoroethylene or other suitable material.

The seat retaining ring 86 is releasably held in the seat accommodating recess 76 by a snap ring 106 removably positioned in an inwardly open annular groove 108 in the inner end of the cylindrical recess wall 80 to radially overlap and abut against the inward, radial face of the retaining ring leg 90. The snap ring 106 is positioned in relation to the bottom surface 82 of the recess 76 and in relation to the axial length of the retaining ring leg 88 to provide for limited axial displacement or play of the retaining ring 86 in its operating position between the snap ring 106 and the recess bottom surface 82.

It should be noted with reference to FIG. 2 that the radially inward recess surface 84 having a truncated conical shape is formed on an annular lip portion 110 of the body 12. The body lip portion 110 encircles the inner end of the fluid passage 16 and defines at its radially inward edge, with respect to the ball 20, a narrow, annular fire seal surface 112 confronting the opposing ball surface 60, but positioned, with respect to the ball, radially outward of the sealing surface 62 on the seat 56. The function of the fire seat sealing surface 112 to form with the ball an emergency seat in the event of overheating of the yieldable polymeric seat 56 by the heat of a fire will be described presently.

A highly effective sealing engagement of the seat sealing surface 62 with the ball surface 60 is provided and continuously maintained dynamically by the continuous action on the major portion of the yieldable polymeric seat 56 of two annular compression springs 114, 116 which continuously act respectively to apply generally axial and generally radial forces to the radially inward portion 118 of the seat 56 which defines and underlies the sealing surface 62 and constitutes the major portion of the mass of the seat 56.

The spring 116 is a radial compression spring. Annular in shape, it has a generally cylindrical form modified, as illustrated in FIGS. 2 and 6, to have, as viewed axially, the wavy form of a generally sinuous wave. The spring 116 is assembled into a cylindrical notch 120 extending axially into the seat 56 from its axially outward side 68, as illustrated in FIG. 2, and having a radial spacing from the radially outward surface 66 of the seat 56 which is relatively small in relation to the radial spacing of the notch 120 from the radially inward seat surface 72.

The radial excursions of the sinuous waves 122, FIG. 6, in the spring 116 are sufficiently extensive in relation to the radial width of the space within the notch 120 accommodating the spring that the undulations or waves 122 are normally flattened somewhat by radially compressive loading of the spring 116 effected upon assembly of the valve parts together. As a consequence, the wavy spring 116 has a residual stress which causes the waves or undulations 122 to exert continuously radially inward force on the valve seat portion 118 located inwardly of the spring 116 and underlying and defining the sealing surface 62 mentioned. The radially inward force exerted by the spring 116 on the valve seat portion 118 is represented in FIGS. 2 and 6 by the arrows 124.

By virtue of the extensive axial length of the spring 116 and the circumferential distribution of the undulations 122, the radial force 124 is distributed over an extensive surface area of the yieldable polymeric valve seat portion 118 with the consequence that harmful stress concentrations on the yieldable polymeric structure of the valve seats are avoided even though the cumulative radial force 124 applied by the spring 116 to the seat portion 118 can be very strong. A narrow circumferential discontinuity 126 in the spring 116, illustrated in FIG. 6, aids working of the spring to apply to the seat portion 118 the radial force 124 desired.

The other spring 114 which continuously applies a generally axial force to the seat portion 118 has the generally overall form of a truncated cone modified, as illustrated in FIG. 5, to have, as viewed on edge, a wavy or undulating configuration of generally sinuous form, the individual undulations being denoted in FIG. 5 by the reference number 128.

As shown in FIG. 2, the spring 114 is located radially between the notch 120 in the seat 56 and the radially inward surface 84 of the body recess 76. The undulations 128 of the spring 114 are compressed somewhat upon assembly of the parts, thus acquiring a residual stress causing the undulations to apply to the adjacent surface 68 of the seat portion 118 an axially inward force 130 represented graphically in FIGS. 2 and 5 by arrows. By virtue of the radial extension of the spring 114 across substantially the entire adjacent surface of the seat portion 118 and the circumferential distribution of the spring undulations 128, the cumulative force 130 applied by the spring to the seat portion 118 can be very strong without subjecting the yieldable polymeric structure of the seat to damaging concentrations of stress.

As shown in FIGS. 2 and 5, the annular spring 114 is supported on the body recess surface 82 and has a circumferential discontinuity or gap 132 which aids working of the spring under load to apply the continuous force 130 to the seat portion 118.

The vector sum 134 of the radially inward force 124 applied by the spring 116 to the inner seat portion 118 and the axially inward force 130 applied by the spring 114 to the same seat portion is represented in FIG. 2 by the arrow 134. As indicated generally by the arrow 134, the cumulative spring force applied to the inner seat portion 118 is generally perpendicular to the ball surface 60 against which the seat sealing surface 62 is continuously urged by the cumulative spring force 134.

Having reference to FIG. 2, the cumulative spring force 134 on the major portion 118 of the seat 56 underlying the sealing surface 62 tends to pivot or swing this portion of the seat toward the adjacent ball 20 about the narrowed interconnection of the seat portion 118 around the axially inner end of the spring accommodating seat slot 120 with a relatively thin annular portion 136 of the seat 56 lying radially outward of the spring 116, adjacent the seat retaining leg 88. At this juncture, it may be noted that the spring 116 also reacts radially outward on the seat portion 136, thus tending to continuously expand radially this portion of the seat and hold it firmly against the cylindrical leg 88 of the seat retaining ring 86. This seat expanding action of the spring 116 serves to advantage in conjunction with the O-ring seal 94 in providing an effective circumferential seal between the seat 56 and the retaining ring 86.

As indicated, the over-all spring force 134 tending to urge the major portion 118 of the seat 56 toward the ball surface 60 is evenly distributed circumferentially around the seat 56. Since it is generally perpendicular to the ball surface 60, it can be very strong, creating an intensive sealing pressure between the seat sealing surface 62 and the ball surface 60 without effecting damaging extrusion or cold flow of the yieldable polymeric seat structure along the ball surface 60.

Moreover, the elasticity of the springs 116, 114 enables the springs to "follow up" the seat portion 118 to compensate for normal erosion and unavoidable deformation of the seat portion 118 to continue to apply to the seat portion 118 the cumulative spring force 134 to maintain virtually undiminished the effectiveness of the seal provided between the seat and the ball over a prolonged service life.

When the seat 56 is on the upstream side of the valve, the spring force 134 on the seat portion 118 may be supplemented by the force of high pressure fluid acting on the axially outward seat surface 68 of the seat as well as by the force of high pressure fluid gaining entry into the seat slot 120 and urging the sealing surface 62 into engagement with the ball 20. To assure the entry of high pressure fluid into the recess 76 to act on the seat portion 118, as described, when the seat 56 is on the high pressure side of the ball 20, a plurality of circumferentially spaced grooves 136, FIG. 2, in this instance four, are recessed into the surface 72 to extend laterally across the surface 72 between the ball confronting side 61 and the opposite side 68 of the seat 56.

In the event fluid entrapped within the valve chamber 14 upon closure of the valve is subsequently heated, due to the valve being exposed to heat from the sun or from some other heat source, the fluid pressure within the valve chamber 14 may increase to abnormally high pressure levels due to the tendency of the entrapped fluid to expand in volume as its temperature increases. Unless released, the elevation in internal fluid pressure of the entrapped fluid can have damaging consequences However, in the valve 10, the valve seat 56, for example, will be displaced away from the ball 20 against the yieldable force of the springs 114 and 116 under the force of fluid pressure on the seat 56 and on the seat retaining ring 86, as indicated by the arrows 137 in FIG. 3, with the consequence that the sealing surface 62 is temporarily released from the ball surface 60 sufficiently to release the expanded volume of fluid trapped and heated in the valve chamber 14.

This action of the typical seat 56 is illustrated in FIG. 3. In the preferred construction illustrated, the annular side 61 of the seat 56 confronting the ball 20 is relieved somewhat along a radially outward annular band 138 of the seat side 61, as illustrated in FIGS. 3 and 3. This permits high pressure fluid entrapped and expanded in the valve chamber 14 to act on a portion of the annular seat side 61, as indicated by the arrows 140, to aid in opening a clearance path for the entrapped fluid to escape between the sealing surface 62 and the ball surface 60. Also, in the preferred construction illustrated, FIGS. 2 and 3, the inner marginal edge of the radially outward side 66 and the inner marginal edge of the axially inward side 64 of the seat 56 are slightly beveled as indicated by the numbers 142 and 144, FIG. 2.

As previously described, the trunnion bearings 28, 30 which support the ball trunnions 24, 26 are preferably formed of a yieldable material. Consequently, the trunnion bearings 28, 30 can yield somewhat under the load of fluid pressure on the ball 20 to allow limited displacement of the ball in the downstream direction, intensifying the sealing pressure of the ball against the downstream seat, the sealing effectiveness of the upstream seat being continuously maintained by the previously described spring pressure on the upstream seat as it may be supplemented by the force of fluid pressure on the upstream seat. Thus, the upstream seat urged against the ball by the cumulative force of two springs as described is capable of following the retreating ball to maintain the effectiveness of its sealing engagement with the ball.

In the event the valve is subjected to the heat of a fire elevating its temperature sufficiently to cause collapse of the yieldable polymeric seats 56, 58 which tend to be heat sensitive and subject to destruction at temperatures not sufficiently high to destroy the metallic ball 20 and body 12, the elevated temperatures of the valve operates at the same time to render an effective collapse of the trunnion bearings 28, 30 with the result that the ball 20 is displaced under the force of fluid pressure on the ball in a downstream direction causing the ball surface 60 to engage the annular fire seal surface 112 formed by the body lip 110 adjacent to but normally spaced from the ball surface 60 in the manner previously described. The engagement of the ball 20 against the downstream fire seal surface 112 to block acceptably the flow of fluid through the valve even in the event of heat destruction of the yieldable polymeric seats 56, 58 is illustrated in FIG. 4.

While the ball 20 in the valve 10 illustrated is supported with the aid of trunnions and trunnion bearings 28, 30 as described, it will be appreciated that the spring-supported seats are not necessarily limited to use with a trunnion mounted ball, but can be employed in a ball valve in which the ball is supported essentially by the coacting seats. Such a valve can be visualized as the valve 10 illustrated, but with the trunnion bearings 28, 30 left out.

The invention is claimed as follows:

1. A ball valve comprising, in combination, a valve body defining an internal valve chamber and two flow passages opening into said chamber, a centrally bored flow control ball rotatably disposed within said chamber, two seat recesses formed in said body in encircling relation to the inner ends of said respective passages; each recess having in radial section three sides constituting respectively a radially outward side of generally cylindrical shape, an axially outward side of a truncated generally conical shape having a wide apex angle diverging axially inward, and a radially inward side having a truncated generally conical shape with a narrow apex angle diverging axially outward; two annular valve seats disposed in said respective seat recesses and being formed of a yieldable polymeric material; each of said seats having five annular sides constituting respectively a sealing side confronting the adjacent exterior surface of said ball to seal thereagainst, a radially inward side having a truncated generally conical shape conforming generally to that of the radially inward side of the corresponding recess, an axially outward side having a truncated generally conical shape conforming generally to that of the axially outward side of the corresponding recess, a radially outward side of generally cylindrical shape, and an axially inward side of generally flat shape; two seat support rings encircling said respective seats and having individually a generally L-shape in radial section, each seat support ring having a generally cylindrical axial leg closely encircling the radially outward side of the corresponding seat and being slidably encircled by the radially outward side of the corresponding recess, each seat support ring having a radial leg of generally flat annular form projecting radially inward alongside the axially inward side of the adjacent seat and stopping somewhat short of said sealing side of the seat to have limited clearance with respect to the adjacent ball, two retaining rings removably supported in said body adjacent the inner portions of said respective seat support rings to retain the latter against dislodgment from said recesses, two axially acting annular compression springs disposed respectively between said axially outward sides of said respective recesses and the axially outward sides of said respective seats, said axially acting compression springs each having the general overall form of a truncated cone and having circumferentially the general form of a sinuous wave so that the spring reacts on the axially outward side of the corresponding recess and responds to axial loading of the spring to exert on the adjacent side of the corresponding seat an inward force in a generally axial direction, each seat defining an annular notch extending thereinto from the axially outward side of the seat in radially spaced relation to the radially inward side of the seat, two radially acting annular compression springs of generally cylindrical form over all disposed within said notches in said respective seats and individually having circumferentially the general shape of a sinuous wave, each of said radially acting springs being normally subject to radial load to continuously apply a circumferentially distributed radially inward force to the portion of the corresponding seat disposed radially inward of the spring and to apply a circumferentially distributed radially outward force to the portions of the corresponding seat disposed radially outward of the spring, an O-ring seal supported in the cylindrical axial leg of each seat support ring in engagement with the radially outward side of the corresponding seat to form a continuous seal between the support ring and the seat, an O-ring seal supported in said body in engagement with the cylindrical axial leg of each seat support ring to form a continuous seal between the seat support ring and the valve body, and operating means coacting with said flow control ball to rotate the latter between valve open and valve closed positions.

2. A ball valve comprising, in combination, a valve body defining an internal valve chamber and two flow passages opening into said chamber, a centrally bored flow control ball rotatably disposed within said chamber and having two oppositely extending support trunnions thereon, trunnion bearing means journalling said trunnions and being formed of heat sensitive yieldable polymeric material, two seat recesses formed in said body in encircling relation to the inner ends of said respective passages; each recess having in radial section three sides constituting respectively a radially outward side of generally cylindrical shape, an axially outward side of a truncated generally conical shape having a wide apex angle diverging axially inward, and a radially inward side having a truncated generally conical shape with a narrow apex angle diverging axially outward; two annular valve seats disposed in said respective seat recesses and being formed of a yieldable polymeric material; each of said seats having five annular sides constituting respectively a sealing side confronting said ball, a radially inward side having a truncated generally conical shape conforming generally to that of the radially inward side of the corresponding recess, an axially outward side having a truncated generally conical shape conforming generally to that of the axially outward side of the corresponding recess, a radially outward side of generally cylindrical shape, and an axially inward side of generally flat shape; said sealing side of each seat defining along the radially inward side thereof an annular ball sealing surface of considerable lateral width confronting said ball to seal thereagainst, said sealing side of each seat having in relation to the ball sealing surface thereon a shallow relief extending over an annular band of said sealing side located on the radially outward side of the sealing surface, said radially inward side of the seat defining therein a plurality of grooves extending laterally thereacross, two seat support rings encircling said respective seats and having individually a generally L-shape in radial section, each seat support ring having a generally cylindrical axial leg closely encircling the radially outward side of the corresponding seat and being slidably encircled by the radially outward side of the corresponding recess, each seat support ring having a radial leg of generally flat annular form projecting radially inward alongside the axially inward side of the adjacent seat and stopping somewhat short of said sealing side of the seat to have limited clearance with respect to the adjacent ball, two retaining rings removably supported in said body adjacent the inner portions of said respective seat support rings to retain the latter against dislodgment from said recesses, two axially acting annular compression springs disposed respectively between said axially outward sides of said respective recesses and the axially outward sides of said respective seats, said axially acting compression springs each having the general over-all form of a truncated cone and having circumferentially the general form of a sinuous wave so that the spring reacts on the axially outward side of the corresponding recess and responds to axial loading of the spring to exert on the adjacent side of the corresponding seat an inward force in a generally axial direction, each seat defining an annular notch extending thereinto from the axially outward side of the seat in radially spaced relation to the radially inward side of the seat, two radially acting annular compression springs of generally cylindrical form over all disposed within said notches in said respective seats and individually having circumferentially the general shape of a sinuous wave, each of said radially acting springs being normally subject to radial load to continuously apply a circumferentially distributed radially inward force to the portion of the corresponding seat disposed radially inward o fthe spring and to apply a circumferentially distributed radially outward force to the portions of the corresponding seat disposed radially outward of the spring, an O-ring seal supported in the cylindrical axial leg of each seat support ring in engagement with the radially outward side of the corresponding seat to form a continuous seal between the support ring and the seat, an O-ring seal supported in said body in engagement with the cylindrical axial leg of each seat support ring to form a continuous seal between the seat support ring and the valve body, and operating means coacting with said flow control ball to rotate the latter between valve open and valve closed positions.

3. A ball valve comprising, in combination, a valve body defining an internal valve chamber and two flow passages opening into said chamber, a centrally bored flow control ball rotatably disposed within said chamber, two seat recesses formed in said body in encircling relation to the inner ends of said respective passages; each recess having in radial section three sides constituting respectively a radially outward side of generally cylindrical shape, an axially outward side of a truncated generally conical shape having a wide apex angle diverging axially inward, and a radially inward side having a truncated generally conical shape with a narrow apex angle diverging axially outward; two annular valve seats disposed in said respective seat recesses and being formed of a yieldable polymeric material; each of said seats having five annular sides constituting respectively a sealing side confronting the adjacent exterior surface of said ball to seal thereagainst, a radially inward side having a truncated generally conical shape conforming generally to that of the radially inward side of the corresponding recess, an axially outward side having a truncated conical shape conforming generally to that of the axially outward side of the corresponding recess, a radially outward side of generally cylindrical shape, and an axially inward side of generally flat shape; two seat support rings encircling said respective seats and having individually a generally L-shape in radial section, each seat support ring having a generally cylindrical axial leg closely encircling the radially outward side of the corresponding seat and being slidably encircled by the radially outward side of the corresponding recess, each seat support ring having a radial leg of generally flat annular form projecting radially inward alongside the axially inward side of the adjacent seat and stopping somewhat short of said sealing side of the seat to have limited clearance with respect to the adjacent ball, two axially acting annular compression springs disposed respectively between said axially outward sides of said respective recesses and the axially outward sides of said respective seats, said axially acting compression springs each having the general overall form of a truncated cone and having circumferentially the general form of a sinuous wave so that the spring reacts on the axially outward side of the corresponding recess and responds to axial loading of the spring to exert on the adjacent side of the corresponding seat an inward force in a generally axial direction, each seat defining an annular notch extending thereinto from the axially outward side of the seat in radially spaced relation to the radially inward side of the seat, two radially acting annular compression springs of generally cylindrical form over all disposed within said notches in said respective seats and individually having circumferentially the general shape of a sinuous wave, each of said radially acting springs being normally subject to radial load continuously to apply a circumferentially distributed radially inward force to the portion of the corresponding seat disposed radially inward of the spring and to apply a circumferentially distributed radially outward force to the portion of the corresponding seat disposed radially outward of the spring, two annular seals engaging said respective seat support rings and adjacent portions of said valve body to form seals between said seat support rings and said valve body, and operating means coacting with said flow control ball to rotate the latter between valve open and valve closed positions.

4. A ball valve comprising, in combination, a valve body defining an internal valve chamber and two flow passages opening into said chamber, a centrally bored flow control ball rotatably disposed within said chamber, two seat recesses formed in said body in encircling relation to the inner ends of said respective passages; each recess having in radial section three sides constituting respectively a radially outward side, an axially outward side, and a radially inward side; two annular valve seats disposed in said respective seat recesses and being formed of a yieldable polymeric material; each of said seats having five annular sides constituting respectively a sealing side confronting the adjacent exterior surface of said ball to seal thereagainst, a radially inward side conforming generally to the radially inward side of the corresponding recess, an axially outward side conforming generally to the axially outward side of the corresponding recess, a radially outward side, and an axially inward side extending radially substantially from said radially outward side to said sealing side of the seat; two seat support rings disposed in concentric adjacent relation to said respective seats and confronting the axially inward sides of the corresponding seats to support the latter, two axially acting annular compression springs disposed respectively between said axially outward sides of said respective recesses and the axially outward sides of said respective seats and being compressed to react on the axially outward sides of the corresponding recesses and to exert on the adjacent sides of the corresponding seats inward forces in a generally axial direction, each seat defining an annular notch extending thereinto from the axially outward side of the seat in radially spaced relation to the radially inward side of the seat, two radially acting annular compression springs disposed within said notches in said respective seats and individually being compressed radially to continuously apply a circumferentially distributed radially inward force to the portion of the corresponding seat disposed radially inward of the spring and to apply a circumferentially distributed radially outward force to the portion of the corresponding seat disposed radially outward of the spring, and operating means coacting with said flow control ball to rotate the latter between valve open and valve closed positions.

5. A ball valve comprising, in combination, a valve body defining an internal valve chamber and two flow passages opening into said chamber, a centrally bored flow control ball rotatably disposed within said chamber, two seat recesses formed in said body in encircling relation to the inner ends of said respective passages, two annular valve seats supported in said respective seat recesses and being formed of a yieldable polymeric material, each of said seats having an inner annular portion thereof defining an annular sealing surface confronting said ball to seal thereagainst, two axially acting annular compression springs supported by said valve body and acting on said respective seats to apply thereto inward forces in generally axial directions, two radially acting annular springs encircling said inner annular portions of said respective seats to continuously apply thereto circumferentially distributed radially inward forces, and operating means coacting with said flow control ball to rotate the latter between valve open and valve closed positions.

6. A ball valve comprising, in combination, a valve body defining an internal valve chamber and two flow passages opening into said chamber, a centrally bored flow control ball rotatably disposed within said chamber and having two oppositely extending support trunnions thereon, trunnion bearing means journalling said trunnions and being formed of heat sensitive yieldable polymeric material, two seat recesses formed in said body in encircling relation to the inner ends of said respective passages; each recess having in radial section three sides constituting respectively a radially outward side, an axially outward side, and a radially inward side; two annular valve seats disposed in said respective seat recesses and being formed of a yieldable polymeric material; each of said seats having an annular sealing side confronting said ball, a radially inward annular side confronting the radially inward side of the corresponding recess, an axially outward annular side confronting the axially outward side of the corresponding recess, and a radially outward annular side encircled by the radially outward side of the corresponding recess; first annular spring biasing means supported on said valve body and acting on said respective valve seats to urge said seats axially, and second spring means carried respectively by each valve seat to apply thereto radially inward forces, such that said sealing sides are urged into sealing engagement with said ball, and operating means coacting with said flow control ball to rotate the latter between valve open and valve closed positions.

7. A ball valve comprising, in combination, a valve body defining an internal valve chamber and two flow passages opening into said chamber, a centrally bored flow control ball rotatably disposed within said chamber, two seat recesses formed in said body in encircling relation to the inner ends of said respective passages, two annular valve seats supported in said respective seat recesses and being formed of a yieldable polymeric material, each of said seats having an inner annular portion thereof defining an annular sealing surface confronting said ball to seal thereagainst, first annular spring means supported by said valve body and acting on said inner annular portions of said respective seats continuously to urge said annular sealing surfaces axially, and second annular spring means acting on said inner annular portions to apply thereto radially inward forces, such that said annular portions are urged against said ball to form a seal therewith, and operating means coacting with said flow control ball to rotate the latter between valve open and valve closed positions.

References Cited

UNITED STATES PATENTS

| | | | |
|---|---|---|---|
| 2,529,412 | 11/1950 | Parker | 251—174 |
| 2,890,017 | 6/1959 | Shafer | 251—174 |
| 2,988,320 | 6/1961 | Kent | 251—315 XR |
| 3,235,224 | 2/1966 | Grove | 251—315 XR |

HAROLD W. WEAKLEY, Primary Examiner

U.S. Cl. X.R.

251—180, 315, 317